Jan. 8, 1957 — A. E. REED — 2,777,103
DRIFT STABILIZED VELOCITY SERVO
Filed Nov. 17, 1955
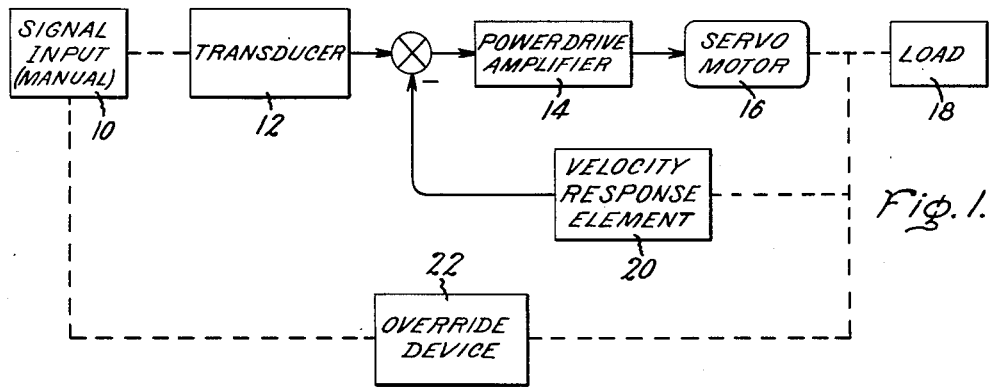
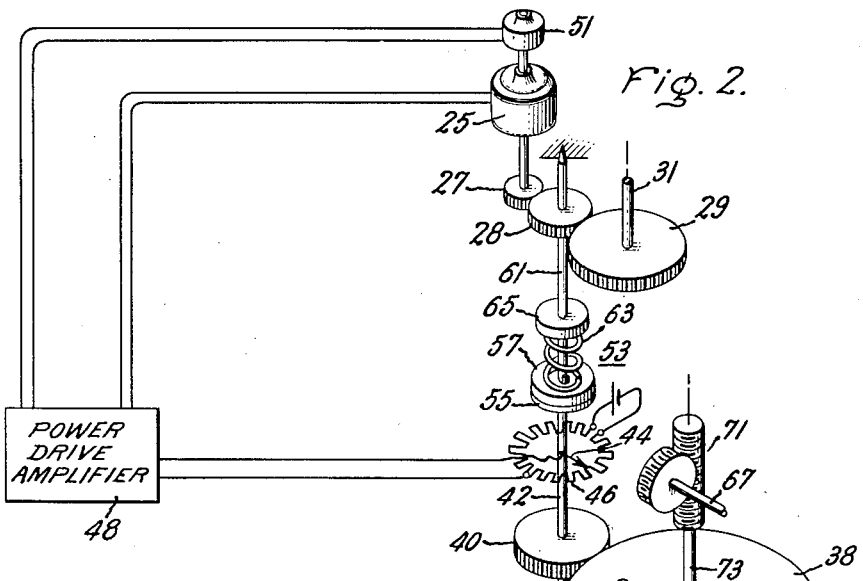
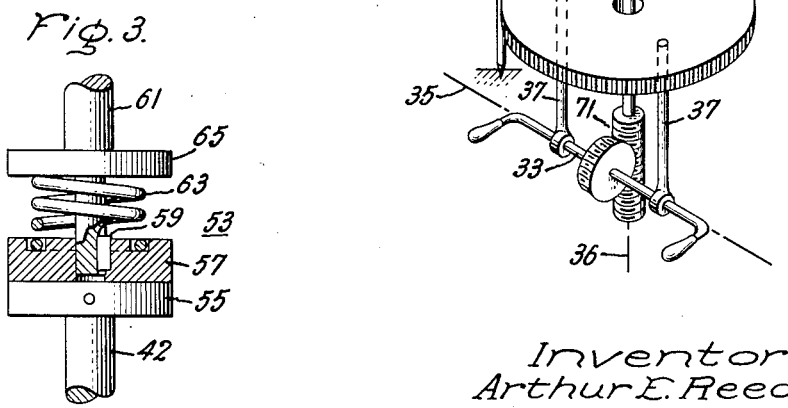
Inventor:
Arthur E. Reed,
by Charles H. Mott
His Attorney.

United States Patent Office 2,777,103
Patented Jan. 8, 1957

2,777,103

DRIFT STABILIZED VELOCITY SERVO

Arthur E. Reed, Schenectady, N. Y., assignor to General Electric Company, a corporation of New York Application November 17, 1955, Serial No. 547,429

5 Claims. (Cl. 318—32)

This invention relates to servo systems and more specifically to such systems of the type wherein the speed of the servo output motor and its coupled load is controlled by the setting of a control input member, the proper relationship between output motor speed and input member setting being maintained by a velocity response element driven by the output motor and providing a velocity feedback to the input member.

Servo systems of the type described are of general utility and find wide use in many applications such, for example, as in gun fire control apparatus. Thus, many gun turrets and mounts include a handstation, servo amplifier and output servomotor arranged for control of the gun drive as a velocity servo system, whereby the operator in causing the gun to follow or track a moving target simply adjusts the handstation to an appropriate setting such as to maintain the velocity of movement of the gun in correspondence with the velocity of the target. Thus with systems of this type it is not necessary that the operator continuously move the handstation to follow a target, as it would be if a position type control were used.

Velocity control systems are heretofore used have performed only poorly, however, when used against zero velocity targets, i. e., targets which are stationary or moving only very slowly. This difficulty stems from the fact that any drift or zero shift in the amplifier and motor of the drive is manifested as a velocity at the motor, even though the handstation may be properly set to the position corresponding to zero velocity. Such drift or zero shift results from disturbances caused, for example, by change in temperature and supply voltage. Also, stray pickup in the lines carrying the various control voltages may prove troublesome in some cases, giving rise to effects similar to those of drifts.

While a number of methods for overcoming these difficulties have heretofore been proposed none have proven completely successful. Most involve the difficult and costly procedure of designing amplifier and prime mover components to have very low drift characteristics, and then including in the servo circuit a balance potentiometer which may be reset to compensate whatever drift remains. Because some drift always is present, it is necessary in these prior systems either to electrically switch the system over to a position type controller when at zero velocity position or else to set a brake holding the output motor and its load at zero velocity. Aside from the complexity of the switching and brake apparatus necessary in such systems, their operation is not completely satisfactory because when the system is changed back from its zero velocity or hold mode to its tracking mode it may immediately start to drift, thus necessitating an adjustment of the balance potentiometer whenever switching from the one mode to the other. A further difficulty is the lack of any assurance that the gun will move in the proper direction when the operator changes back to the tracking mode and moves the handstation just slightly to either side of zero velocity setting, in order to obtain very slow movement of the gun. This inability to follow small changes in handstation position near zero velocity setting leads to erratic tracking at slow tracking rates and makes it necessary to frequently reset the balance potentiometer.

It is accordingly an object of the invention to provide a velocity servo system not subject to these and other weaknesses and disadvantages of such prior systems, and characterized by completely reliable and drift-free performance particularly at and near zero velocity settings.

Another object of the invention is the provision, in a handstation controlled velocity servo system having a potentiometer or like signal input element positioned by the handstation, of means for changing at zero velocity setting of the handstation from normal velocity type control to a position type control wherein the handstation is automatically reset, in event of drift, to a position accurately corresponding to zero output velocity.

Still another object is the provision, in a servo system having manually operated signal input means and a velocity feedback loop, of a position feedback loop including manually overridable means whereby the operator may determine whether the position feedback is or is not to be effective at any given time by manual control of the input signal means.

It is also an object of the invention to provide a velocity loop servo system stabilized against drift and erratic operation at and near zero velocity settings by means characterized by reliability, simplicity and economy of manufacture, and also by adaptability to use in existing systems with little if any modification thereof.

The invention is carried out in one form as applied to a velocity servo system in which a handstation operated signal input element effects direct control of the speed and direction of movement of the output servo motor, a feedback signal from a velocity response element such as a tachometer being employed to maintain precisely the motor speed indicated by the position of the handstation. In accordance with the invention the handstation is connected mechanically to the output motor through an override device such as a friction or magnetic clutch, to thus provide a position feedback from the servo motor to the handstation through the override device. During handstation control the operator can, by applying sufficient force to the handstation, override this position feedback from the output motor and thus obtain straight velocity control just as if the position feedback loop were not in the system. Upon release of the handstation by the operator, the motor then may drive the handstation through the override device, to thus provide position feedback through the override device. The arrangement is such that this position feedback is degenerative and drives the handstation in a direction such that its input signal will balance out whatever extraneous signals may be present to cause drift. Drifts and other disturbances in the system thus are cancelled by small compensating shifts in the handstation zero position.

My invention will itself be more fully understood and its various objects, features and advantages further appreciated by reference to the appended claims and the following detailed specification when read in conjunction with the accompanying drawings, wherein:

Fig. 1 represents in block form a velocity servo system in accordance with the invention;

Fig. 2 illustrates diagrammatically a gun turret handstation provided with a velocity servo system embodying the invention; and Fig. 3 is a part sectional view of an override device suitable for use in the servo system of Fig. 2.

With continued reference to the drawings, wherein like reference numerals have been used throughout to designate like elements, the velocity servo system of Fig. 1 comprises as shown a manually operated input element 10 such as a handwheel or the like, connected to operate an input signal transducer 12. The control signal from transducer 12 acts through power drive amplifier 14 to control an output motor 16 for operation in a direction and at a rate dependent on the position of manual input means 10 as adjusted by the operator. As is conventional in velocity servo systems of this type, the servo loop is closed through a velocity response element 20 producing a feedback signal which is compared with the input signal from transducer 12 to maintain whatever velocity of the motor is indicated by the position of manual input means 10.

While input means 10 has been described as a manually operated device such as the handstation of a gun fire control system, it may instead be any mechanical input the drive to which permits unrestricted motion of the input member when at zero velocity position. Signal transducer 12 may be any suitable transducer such, for example, as a potentiometer which is capable of translating the mechanical movement of input element 10 to whatever type of input signal may be required by power drive amplifier 14, such as a voltage.

By the term "amplifier" is meant any device by means of which a relatively low signal input gives rise to a power output at a sufficiently high power level to drive the servomotor 16. The term thus includes, in addition to electrical power amplifiers, such devices as electromagnetic, hydraulic and pneumatic relays, for example, the type of power amplifying device being used in any particular installation depending on the required input to output signal ratio and other characteristics of the servo system.

Velocity response element 20 preferably is of a type providing an output signal indicative of both the direction and rate of movement of the servomotor 16, the output signal preferably being such as to permit its direct comparison to the output signal from transducer 12, without conversion of either signal. The velocity response element conveniently may be of tachometer generator type, though other response elements such, for example, as rate gyroscopes may instead be used.

As will be apparent to those skilled in the art, the elements thus far described together constitute a conventional velocity servo system. In accordance with the invention, the above explained disadvantages of prior such systems are obviated by incorporating in the system a position feedback loop from the output servomotor to the signal input means, with the feedback loop containing an overridable device 22 such as a magnetic clutch or friction clutch which slips when the signal input means is forcibly held.

The overridable clutch 22 should have maximum torque transmitting characteristics such that it may be forcibly overridden by the operator for the purpose of moving the signal input means 10 independently of the position and action of output motor 16. At the same time, its torque transmitting characteristics should be such that in the absence of any force applied by the operator to signal input element 10, the servomotor 16 then can move the input element through the clutch.

The operation of the system is as follows: If the operator applies sufficient force to the handstation or other input element 10 to overcome the override device 22, then the input element motion produced by the operator and applied to transducer 12 will cause a signal to be fed to servo amplifier 14 to energize the output motor 16. The resulting movement of the motor will not appear at the input element, however, due to the overpowering of the override device by the operator. The system will under these conditions function as a straightforward velocity system.

Now if the operator releases input element 10 or reduces the force he applies to it to a value less than the torque transmitting capabilities of the overridge device, then the input element will be moved by output motor 16, acting through the override device 22. The arrangement is such that the output position feedback through the override device is in a direction to modify the input element signal in degenerative manner, to slow down and stop the output motor 16. The motor 16 thus drives input element 10 until the drift of the system is just cancelled and, with operation in this manner, drift will be manifested merely as a slight displacement of the input element zero position rather than as a continuous motion or "drift" of the output motor.

Referring now to Fig. 2, there is illustrated a gun turret drive incorporating a servo system provided with both velocity and position feedback in accordance with the invention. The gun and turret are driven in train by a servomotor 25 through reduction gearing 27—29, the output gear 29 being fixed to an output shaft 31 which may be directly connected to the turret or gun (not shown) to drive it in train. Operation of servomotor 25 is under the control of a manually movable handle bar 33 as will now be described.

Handle bar 33 constitutes the input element for the system and is movable by the operator both about a horizontal axis 35 and about a vertical axis 36. Movement of handle bar 33 about vertical axis 36 is effective, through hanger rods 37 and gears 38 and 40, to rotate a shaft 42 carrying the wiper arm 44 of a potentiometer 46, the setting of which provides an input voltage signal controlling the operation of power drive amplifier 48 for energizing the train drive servomotor 25 in a direction and at a speed dependent on the potentiometer setting with respect to its zero position.

Velocity feedback is provided by a tachometer generator 51 the output voltage signal from which is fed to power drive amplifier 48 and there compared with the output signal from potentiometer 46. If servo motor 25 is running at precisely the speed called for by the potentiometer setting, then the tachometer feedback and potentiometer output signals are balanced and power drive amplifier 42 continues to drive servomotor 25 at constant speed. If, however, the speed of servomotor 25 is above or below that required by the setting of potentiometer 46, then the tachometer feedback and potentiometer output signals do not balance and the power drive amplifier output is changed in a manner to adjust the speed of servomotor 25 and reduce its speed error.

An override device 53 such as a friction or magnetic clutch is provided for the purpose of affording position feedback to potentiometer 46 when desired. This clutch 53 may be of any conventional type providing suitable maximum torque transmitting characteristics, and as best shown in Fig. 3, it may comprise a first clutch plate 55 rigidly fixed on the upper end of the shaft 42 which carries the wiper arm 44 of potentiometer 46. A second clutch plate 57 is slidably but non-rotatably mounted, as by a key 59, to the shaft 61 of intermediate gear 28. A compression spring 63 disposed between clutch plate 57 and a flange 65 on the shaft 61 urges clutch plate 57 downwardly into torque transmitting engagement with clutch plate 55.

The position feedback thus provided should be in a direction such that the feedback signal is degenerative and acts to shift the position of the potentiometer wiper arm 44 in a direction to compensate for any drift in the system in the manner explained hereinabove. Clutch 53 should have torque transmission characteristics such that when the operator releases the handle bars 33, any subsequent motion of servomotor 25 will be positively fed back to potentiometer 46 through the clutch 53. At the same time, the torque transmission characteristics must be such that the operator may readily override the feedback signal from servomotor 25 and control the position of the potentiometer wiper arm 44 independently of the position of the servomotor.

It will be understood that a servo system similar to that just described in the train drive system for the gun is also provided for the gun elevation drive. The input to the elevation drive includes a potentiometer (not shown), similar to potentiometer 46 in the train drive, having its wiper arm driven by a shaft 67 (Fig. 2) the angular position of which is under the control of handle bar 33. Rotation of the handle bar about its horizontal axis 35 causes rotation of shaft 67 through the medium of two rack and pinion sets 69 and 71, the pinions of which are interconnected by a vertical shaft 73. The elevation drive further includes a drive motor, tachometer generator and reduction gearing (not shown), with position feedback from the motor to the elevation control potentiometer being provided by an override device (not shown) similar to the clutch 53 already described.

The servo systems of the invention have been described in the foregoing with particular reference to fire control systems, but it is to be understood they are of general utility in many other applications wherein a velocity type servo control is desired free of drift and erratic operation at and near zero velocity setting. A number of specific embodiments of the invention have been shown and described, and various other modifications may be made without departing from the invention. The appended claims therefore are intended to cover all such modifications as fall within the true spirit and scope of the invention.

What I claim as new and desire to secure by Letters Patent of the Unted States is:

1. In a control system for motive equipment having an output member, means producing a first control signal dependent on the speed of said output member, a movable control member for producing a second control signal dependent on its position, means for combining said first and second control signals to produce a resultant motive equipment control signal, and means including an override device mechanically interconnecting said output member and said control member whereby movement of said output member applies a limited force through said override device to urge corresponding movement of said control member.

2. In a control system for controlling the speed and direction of rotation of a motor having a rotary output member, means coupled to said motor output member to produce a first control signal dependent on the speed of rotation thereof, a control member rotatable to produce a second control signal dependent upon its angular position, means for combining said first and second control signals to produce a resultant motor control signal for controlling the speed of rotation of said motor, and means including a normally engaged overridable clutch mechanically interconnecting said motor output member and said control member whereby movement of said output member causes corresponding movement of said control member unless restrained against movement.

3. A servo system comprising a manually movable signal input element for producing an input signal dependent on the position thereof, power amplifier means, an output motor energized by said power amplifier means responsive to said input signal, means for generating a speed signal varying accordingly to the speed of said output motor and connected in opposition to said input signal, and manually overridable normally engaged clutch means mechanically connecting said input element and said output motor and presenting a resistance to relative movement therebetween sufficient to cause said input element to be driven by said output motor unless manually restrained against such movement.

4. A servo system comprising a manually rotatable signal input element having a zero position and responsive to displacement therefrom to produce an input signal dependent on the extent of displacement from said zero position, power amplifier means, a rotary motor energized by said power amplifier means responsive to said input signal, means for generating a speed signal varying accordingly to the speed of said output motor and connected in opposition to said input signal, and manually overridable normally engaged clutch means mechanically connecting said input element and said output motor and presenting a resistance to relative movement therebetween sufficient to cause said input element to be rotated by said output motor except when manually restrained against such movement.

5. In a fire control system having an operator-control handstation, means responsive to the position of said handstation to produce a control signal dependent on the displacement thereof from a zero position, a controlled motor, amplifying means connecting said control signal in driving relation to said controlled motor, means for producing a speed signal proportional to the speed of said controlled motor, means connecting said speed signal to said amplifying means in opposition to said control signal, and means including a normally engaged manually overridable clutch mechanically interconnecting said controlled motor and said handstation whereby said motor on movement thereof urges corresponding movement of said handstation.

No references cited.